US010255248B2

(12) United States Patent
Sun et al.

(10) Patent No.: US 10,255,248 B2
(45) Date of Patent: *Apr. 9, 2019

(54) REFORMATTING MULTIPLE PARAGRAPHS OF TEXT USING THE FORMATTING OF A SAMPLE OBJECT BY CREATING MULTIPLE CANDIDATE COMBINATIONS AND SELECTING A CLOSEST MATCH

(71) Applicant: INTERNATIONAL BUSINESS MACHINES CORPORATION, Armonk, NY (US)

(72) Inventors: Xingzhi Sun, Beijing (CN); Lin H. Xu, Beijing (CN); Yi Q. Yu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/864,052

(22) Filed: Jan. 8, 2018

(65) Prior Publication Data
US 2018/0129633 A1 May 10, 2018

Related U.S. Application Data

(63) Continuation of application No. 15/331,943, filed on Oct. 24, 2016, now Pat. No. 9,916,286, which is a (Continued)

(30) Foreign Application Priority Data
Apr. 28, 2012 (CN) .......................... 2012 1 0133143

(51) Int. Cl.
*G06F 17/24* (2006.01)
*G06F 17/21* (2006.01)
(Continued)

(52) U.S. Cl.
CPC ........ *G06F 17/211* (2013.01); *G06F 17/2211* (2013.01); *G06F 17/2282* (2013.01);
(Continued)

(58) Field of Classification Search
CPC .... G06F 17/211; G06F 17/2282; G06F 17/24; G06F 17/28; G06F 17/248; G06K 2209/01; G06K 9/344
See application file for complete search history.

(56) References Cited

U.S. PATENT DOCUMENTS

| 7,370,274 | B1 | 5/2008 | Stuple et al. |
| 7,461,351 | B2 | 12/2008 | Bailey et al. |
| 7,792,362 | B2 | 9/2010 | Berkner et al. |
| 7,793,224 | B1 | 9/2010 | Ayers |
| 9,411,781 | B2 | 8/2016 | Prasad |

(Continued)

FOREIGN PATENT DOCUMENTS

| CN | 1755667 A | 4/2006 |
| CN | 1794231 A | 6/2006 |

(Continued)

OTHER PUBLICATIONS

ProductivityApps, Stylist Style Copier, www.productivityapps.com/stylecopier.html, Mar. 27, 2012.
(Continued)

*Primary Examiner* — Cesar B Paula
*Assistant Examiner* — Benjamin J Norris
(74) *Attorney, Agent, or Firm* — L. Jeffrey Kelly

(57) ABSTRACT

The invention relates to electronic document processing. Embodiments of the present invention relate to a method and apparatus for copying a text format pattern. In one embodiment of the present invention there is a method for copying a text format pattern, including: receiving a selection of a sample object from a user, the sample object including multiple sample paragraphs of which at least two sample
(Continued)

| 211 | Active Event |
| 212 | Morgan Stanley Cloud Computing Symposium |
| 213 | New York, NY | Tuesday, May 25, 2010 @ 6:00am PT / 9:00am ET |
| 214 | • Bob Dayon, Executive Vice President, CRM, will participate in panel discussion. |
| 215 | • Marc Douglas, Executive Vice President, CRM, will keynote |
| 216 | Listen to the audio webcast |

210

| P1 | Active Event |
| P2 | Kaufman Brothers Cloud Computing Conference |
| P3 | Los Angeles, LA | Wednesday, June 26, 2010 @ 9:15am PT /12:15pm ET |
| P4 | *Virginia Rometty, CEO of IBM, will give presentation* |
| P5 | *Semon Smith, Executive Vice President, CRM, will keynote* |
| P6 | *Rennie Benioff, Executive Vice President, CRM, will be session chair* |
| P7 | Listen to the audio webcast |

220 paragraphs have different format patterns; receiving a format copying instruction of from the user, the format copying instruction indicating reformatting a target object with the format pattern of the sample object, where the target object contains multiple target paragraphs; determining a corresponding relationship of the format pattern of the sample paragraphs with the target paragraphs; and applying the format pattern of the sample paragraphs to the target paragraphs in accordance with the corresponding relationship.

16 Claims, 8 Drawing Sheets

Related U.S. Application Data continuation of application No. 13/859,840, filed on Apr. 10, 2013, now Pat. No. 9,519,622.

(51) Int. Cl.
*G06F 17/22* (2006.01)
*G06F 17/27* (2006.01)

(52) U.S. Cl.
CPC ............ *G06F 17/24* (2013.01); *G06F 17/248* (2013.01); *G06F 17/2785* (2013.01)

(56) References Cited

U.S. PATENT DOCUMENTS

| | | |
|---|---|---|
| 9,519,622 B2 | 12/2016 | Sun et al. |
| 9,626,098 B2 | 4/2017 | Migos |
| 10,025,979 B2 | 7/2018 | Lazarevic et al. |
| 2007/0061714 A1 | 3/2007 | Stuple et al. |
| 2009/0292987 A1 | 11/2009 | Sorenson |
| 2010/0241954 A1 | 9/2010 | Stuple et al. |
| 2010/0251093 A1 | 9/2010 | Broman et al. |
| 2014/0040730 A1 | 2/2014 | Prasad |
| 2017/0075863 A1 | 3/2017 | Sun et al. |

FOREIGN PATENT DOCUMENTS

| | | |
|---|---|---|
| CN | 101258489 A | 9/2008 |
| CN | 103377174 A | 10/2013 |

OTHER PUBLICATIONS

"Research of Copy Detection of Chinese Scientific Papers Base on Text Structure and Content", Abstract, Hefei University of Technology, Master Dissertation, May 2007, pp. 1-60.

Microsoft Word 2010, Microsoft, Microsoft Word Office Profession Plus 2010, pp. 1-3.

Pending U.S. Appl. No. 15/864,046, filed Jan. 8, 2018, entitled: "Copying Text Format Pattern", 45 pages.

| 211 | Active Event |
| 212 | Morgan Stanley Cloud Computing Symposium |
| 213 | New York, NY | Tuesday, May 25, 2010 @ 6:00am PT / 9:00am ET |
| 214 | • Bob Dayon, Executive Vice President, CRM, will participate in panel discussion. |
| 215 | • Marc Douglas, Executive Vice President, CRM, will keynote |
| 216 | <u>Listen to the audio webcast</u> |

| P1 | Active Event |
| P2 | Kaufman Brothers Cloud Computing Conference |
| P3 | Los Angeles, LA | Wednesday, June 26, 2010 @ 9:15am PT /12:15pm ET |
| P4 | *Virginia Rometty, CEO of IBM, will give presentation* |
| P5 | *Semon Smith, Executive Vice President, CRM, will keynote* |
| P6 | *Rennie Benioff, Executive Vice President, CRM, will be session chair* |
| P7 | Listen to the audio webcast |

| 231 | Active Event |
| 232 | Kaufman Brothers Cloud Computing Conference |
| 233 | Los Angeles, LA | Wednesday, June 26, 2010 @ 9:15am PT /12:15pm ET |
| 234 | • Virginia Rometty, CEO of IBM, will give presentation |
| 235 | • Semon Smith, Executive Vice President, CRM, will keynote |
| 236 | • Rennie Benioff, Executive Vice President, CRM, will be session chair |
| 237 | <u>Listen to the audio webcast</u> |

Active Event
Kaufman Brothers Cloud Computing Conference
Los Angeles, LA | Wednesday, June 26, 2010 @ 9:15am PT /12:15pm ET
Virginia Rometty, CEO of IBM, will give presentation
Semon Smith, Executive Vice President, CRM, will keynote
Rennie Benioff, Executive Vice President, CRM, will be session chair
Listen to the audio webcast

|     | F1 | F2 | F3 | F4 | | F5 |
|-----|----|----|----|----|----|----|
| CT1 | P1 | P2 | P3 | P4 | P5 | P6 | P7 |
| CT2 | P1 | P2 | P3 | P4 | P5 | P6 | P7 |
| CT3 | P1 | P2 | P3 | P4 | P5 | P6 | P7 |
| CT4 | P1 | P2 | P3 | P4 | P5 | P6 | P7 |
| CT5 | P1 | P2 | P3 | P4 | P5 | P6 | P7 |
| CT6 | P1 | P2 | P3 | P4 | P5 | P6 | P7 |
| CT7 | P1 | P2 | P3 | P4 | P5 | P6 | P7 |
| CT8 | P1 | P2 | P3 | P4 | P5 | P6 | P7 |
| CT9 | P1 | P2 | P3 | P4 | P5 | P6 | P7 |
| CT10 | P1 | P2 | P3 | P4 | P5 | P6 | P7 |
| CT11 | P1 | P2 | P3 | P4 | P5 | P6 | P7 |
| CT12 | P1 | P2 | P3 | P4 | P5 | P6 | P7 |
| CT13 | P1 | P2 | P3 | P4 | P5 | P6 | P7 |
| CT14 | P1 | P2 | P3 | P4 | P5 | P6 | P7 |
| CT15 | P1 | P2 | P3 | P4 | FP | P6 | P7 |

FIG. 5D

REFORMATTING MULTIPLE PARAGRAPHS OF TEXT USING THE FORMATTING OF A SAMPLE OBJECT BY CREATING MULTIPLE CANDIDATE COMBINATIONS AND SELECTING A CLOSEST MATCH

BACKGROUND

The present invention relates to electronic document processing and, more particularly, to formatting of the content of electronic documents.

An electronic document (hereinafter referred to as "document") may be generated by using computer document processing software such as Lotus® Symphony® and Microsoft® Word®, which contains such content as text, charts and graphics, etc.

In the process of generating a document using document processing software, format pattern of the content of the document may be configured for the content of the document. For example, font style, font and color, etc., may be configured for textual content.

To facilitate users to set the format pattern for the content of a document, some document processing software allows users to apply the format pattern of one content to another, so that the latter will have the same format pattern as the former.

For example, Microsoft® Word® provides a tool called "Format Painter". A user that is in editing a document can apply or copy the format pattern of existing texts in the document to other texts. If the user wishes to use a text format pattern already existed in the document, he/she may select the text or graphics (or "sample object") of which the format pattern will be copied, click the "Format Painter"  icon on the "common" toolbar, and then click the text or graphics (or "target object") which is to be formatted. As a result, the format pattern of the target object will become the same as the sample object.

With the above method of copying format pattern, only one format pattern may be copied each time. If the sample object contains multiple paragraphs and each paragraph has a different type of format pattern, then the above method can only apply the format pattern of one paragraph contained in the sample object, but it can not simultaneously apply the format patterns of individual paragraphs to different paragraphs of the target object.

SUMMARY

The invention is intended to improve the operation of copying a text format pattern.

In one aspect, a method for copying a text format pattern, includes: receiving a selection of a sample object from a user, the sample object including multiple sample paragraphs of which at least two sample paragraphs have different format patterns; receiving a format copying instruction of from the user, the format copying instruction indicating reformatting a target object with the format pattern of the sample object, where the target object contains multiple target paragraphs; determining a corresponding relationship of the format pattern of the sample paragraphs with the target paragraphs; and applying the format pattern of the sample paragraphs to the target paragraphs in accordance with the corresponding relationship.

In another aspect, an apparatus for copying a text format pattern, includes: a sample selection receiving device, configured to receive a selection of a sample object from a user, the sample object including multiple sample paragraphs of which at least two sample paragraphs have different format patterns; a copy command receiving device, configured to receive a format copying instruction of from the user, the format copying instruction indicating reformatting a target object with the format pattern of the sample object, where the target object contains multiple target paragraphs; a parsing device, configured to determine a corresponding relationship of the format pattern of the sample paragraphs with the target paragraphs; and a format copying device, configured to apply the format pattern of the sample paragraphs to the target paragraphs based on the corresponding relationship determined by the parsing device.

With the inventive method or apparatus, multiple format patterns of a document fragment can be copied to another document fragment simultaneously each time, thus simplifying the operation of the user in editing electronic document.

BRIEF DESCRIPTION OF THE DRAWINGS

Through reading the following detailed description of illustrative embodiments of the disclosure with reference to drawings, the above and other objectives, features and advantages of the disclosure will become clearer. In the illustrative embodiments, the same reference number usually represents the same component.

FIG. 2A illustrates a sample object of an electronic document;

FIG. 2B illustrates a target object of an electronic document;

FIG. 2C illustrates the result of formatting the target object shown in FIG. 2B according to an embodiment of the invention;

FIG. 2D illustrates the result of formatting the target object shown in FIG. 2B in accordance with a prior art technique;

FIG. 5D is a simplified representation of a plurality of candidate trees according to an embodiment of the invention.

DETAILED DESCRIPTION

Preferred embodiments of the present disclosure will be described in greater detail below with reference to the accompanying drawings. The accompanying drawings have shown those preferred embodiments of the present disclosure, however, it should be understood that, the present disclosure can be implemented in various forms, but are not limited to these embodiments illustrated herein. On the contrary, these embodiments are provided for making the present disclosure more thorough and complete, such that the scope of the present disclosure can be completely delivered to one of ordinary skill in the art.

Figure 1:
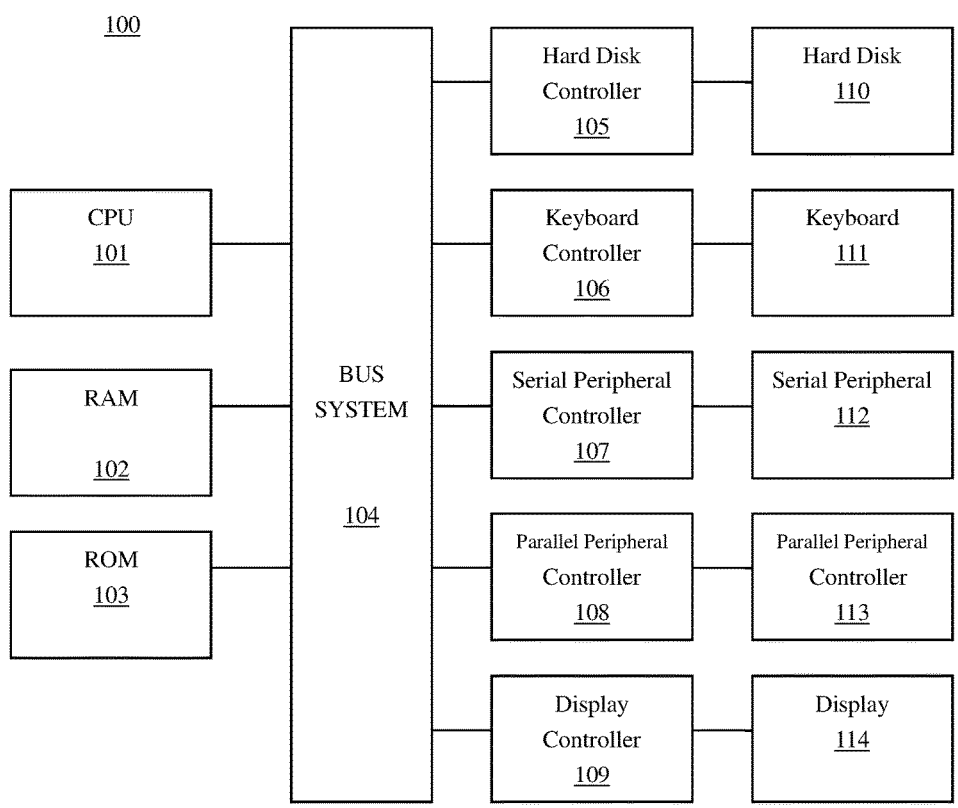
FIG. 1 shows a block diagram of an exemplary computing system 100 adapted to be used to implement embodiments of the invention.

FIG. 1 shows a block diagram of an exemplary computing system 100 which is applicable to implement the embodiments of the present invention. As shown in FIG. 1, the computing system 100 may include: CPU (Central Processing Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose rather than any limitation to the present invention. In some cases, some devices may be added to or removed from the computer system 100 based on specific situations.

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention relates to processing electronic documents with computer document processing software that may be executed on a computer system 100 as shown in FIG. 1.

To facilitate the understanding of the invention, reference is made first to FIG. 2A. FIG. 2A illustrates a document fragment 210 of an electronic document. The document fragment 210 contains a plurality of paragraphs 211, 212, . . . , 216, wherein at least two paragraphs have different format patterns. For example, the paragraph 211 contains the text "Active Event" with the font of "Times", the font style of "plain" and the color of "green". In addition, there are two adjacent paragraphs 214 and 215 that have the same format pattern.

In the present specification, a document fragment like the document fragment 210 is referred to as "sample object", and a paragraph like the paragraph 211, 212, . . . 216 contained in the document fragment is referred to as "sample paragraph".

FIG. 2B illustrates a document fragment 220 of another electronic document. The document fragment 220 as shown contains multiple paragraphs P1, P2, . . . P7, each paragraph having a certain format pattern. For example, the paragraph P1 contains the text "Active Event" with the font of "Times", the font style of "plain" and the color of "black." In addition, the paragraphs P4, P5 and P6 have the same format pattern, for example, their font styles are all "italic".

Suppose the user who is editing the document fragment 220 wants to apply the format pattern of the sample object 210 to the document fragment 220. In the present specification, the document fragment like the document fragment 220 is referred to as the "target object", and the paragraphs P1, P2, . . . P7 contained in the target object 220 are referred to as the "target paragraphs".

The sample object 210 and the target object 220 may be either two document fragments of the same one document, or two document fragments from different documents. As one situation, a particular user A has edited a document fragment 220 of a document and configured format pattern for each paragraphs in the document fragment 220. Later, another user B sends another document to the user A, requiring the user A to re-configure format pattern for the document fragment 220 in accordance with the format pattern of the document fragment 210 in the another document.

FIG. 2C shows the result after the format pattern of the sample object 210 is copied or applied to the target object 220 according to the user's expectation. As shown in FIG. 2C, the result is also a document fragment 230. The document fragment 230 includes paragraphs 231, 232, . . . 237 of which the contents are same as in the target object 220, whereas the format pattern of the paragraphs 231, 232, 233 and 237 is same as the format pattern of the paragraphs 211, 212, 213 and 216 (in FIG. 2A) respectively, and the format pattern of the paragraphs 234, 235 and 236 is same as the format pattern of the paragraphs 214 and 215. In the present invention, a document fragment like the document fragment 230 is referred to as "expected object" and the paragraphs 231, 232, . . . 237 contained in the expected object 230 are referred to as "expected paragraphs.

As mentioned above, MS Word provides a "Format Painter" tool for a user who is editing a document to apply (or copy) the format pattern of a sample object of the document to a target object. If the user wishes to apply the format pattern of the sample object 210 to the target object 220, the following process needs to be performed:

Select the paragraph 211;
Click on the "Format Painter"  in the toolbar; and
Select the paragraph P1.

As a result, the format pattern of the paragraph P1 becomes the same as the paragraph 211.

Repeat the above process for paragraphs P2, P3, P4-P6 and P7. As a result, the format pattern of the target object 220 will become the same as the format pattern of the sample object 210.

If the user takes the entire target object 220 as a unit and attempt to apply the format pattern of the sample object 210, then it is equivalent to performing the following operations:

Select the sample object 210;
Click on the "Format Painter"  in the toolbar; and
Select the target object 220.

The result of the above operations is shown in FIG. 2D. In FIG. 2D, the content of the document object 240 is the same as the target object 220, but the format pattern of each paragraphs of the target object 220 becomes the same as the format pattern of the paragraph 211. This may not be the desired result of the user.

The basic idea of the invention is that, by analyzing the sample object 210 and the target object 220, it is made possible to copy the format pattern of the sample object 210 with the target object 220 containing multiple paragraphs as a unit.

Hereinafter, description of various embodiments of the invention will be provided with reference to the accompanying drawings.

Figure 3:
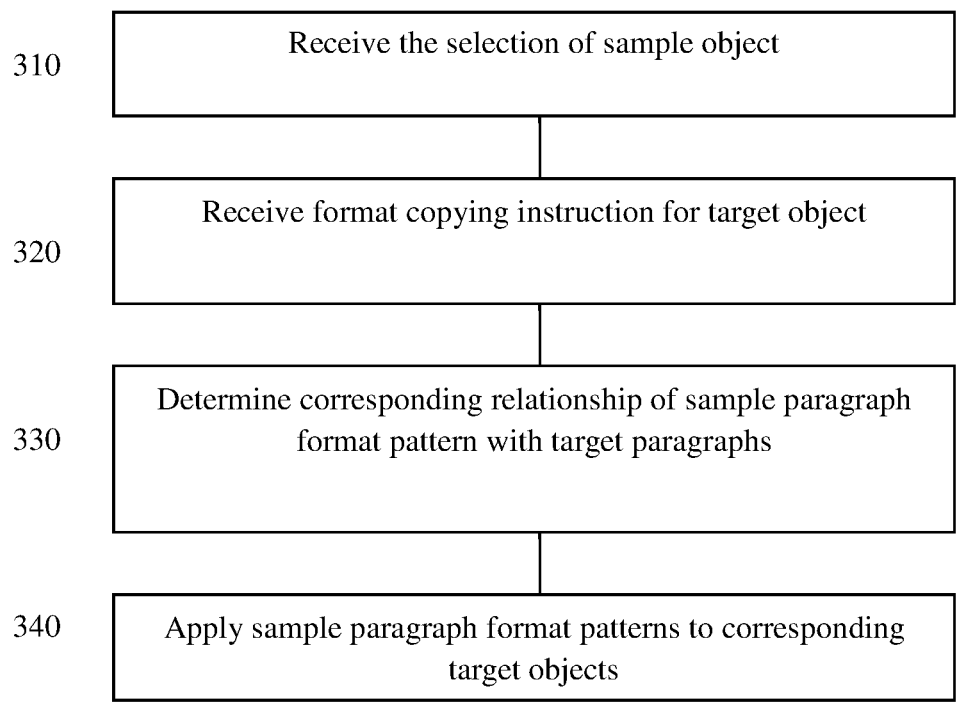
FIG. 3 illustrates a flowchart of the method of copying a text format pattern according to an embodiment of the invention.

Referring now to FIG. 3, which illustrates a flowchart of the method for copying a text format pattern in accordance with an embodiment of the invention. The method illustrated may be implemented in an electronic document processing application running on the computer system 100.

In Step 310, the selection of a sample object is received from a user, the sample object including multiple sample paragraphs of which at least two sample paragraphs have different format patterns.

For example, a user in editing an electronic document may select a sample object in the electronic document by an input tool such as a mouse. The sample object includes a plurality of sample paragraphs, wherein at least two sample paragraphs have different format patterns. An example of the sample object mentioned in Step 310 is the sample object 210 shown in FIG. 2A, which includes six sample paragraphs 211-216 with at least two sample paragraphs (e.g., 211 and 212) having different format patterns.

Those skilled in the art shall appreciate that, in practical applications, Step 310 may be implemented in various ways, for example, in a manner similar to the way of receiving a user's selection of a sample object in the MS Word application. Further explanation in details is not needed here.

It is to be noted that, the content of the sample paragraph may be either textual or of other forms that can be formatted, for example, a table. Sample paragraphs may be separated either by a "carriage return" symbol or other pre-defined delimiters.

In Step 320, a format copying instruction is received from the user, the format copying instruction indicating re-formatting a target object with the format pattern of the sample object, where the target object includes multiple target paragraphs.

Those skilled in the art shall appreciate that, in practical applications, Step 320 may be implemented in various ways. For example, it may be implemented in a similar manner to using the MS Word "Format Painter". In that case, a "copy format" option may be provided on the toolbar of the user interface of the electronic document processing application. The user may select a sample object 210 first, then click the "copy format" option on the toolbar, and then select a target object, for example, the target object 220. This indicates that the user has sent out an instruction requesting for re-formatting the target object 220 in accordance with the selected sample object 210.

The target object to be formatted contains several paragraphs, namely target paragraphs. For example, the target object 220 contains seven target paragraphs P1-P7.

Similar to the sample paragraph, the content of the target paragraph may be either textual or of other forms that can be formatted, for example, a table. Object paragraphs may be separated by either a "carriage return" symbol or other pre-defined delimiters.

The number of target paragraphs is usually equal to or greater than the number of format patterns contained in the sample paragraph.

In Step 330, the corresponding relationship between the format pattern of the sample paragraphs and the target paragraphs is determined.

The sample object and the target object are selected by the user for the purpose of copying format pattern. Therefore, there is intrinsic corresponding relationship between the format pattern of sample paragraphs and the format pattern of the object paragraphs. By analyzing and comparing the characteristics of the sample paragraphs and the characteristics of the target paragraphs, such as different format patterns of the sample paragraphs contained in the sample object and the number of and format patterns of the target paragraphs contained in the target object, the corresponding relationship between the format pattern of the sample paragraphs and the target paragraphs may be identified.

In accordance with an embodiment of the invention, the corresponding relationship of the format pattern of the sample paragraphs with the target paragraphs may be determined by comparing the positional relationship between the sample paragraphs and the target paragraphs.

An intuitive simple situation includes that the number of sample paragraphs is equal to the number of target paragraphs, for example, a sample object contains n sequential sample paragraphs s1, s2, . . . sn, and a target object also contains n sequential target paragraph t1, t2, . . . tn. Through analysis and comparison, it may be determined that there is a corresponding relationship between the sample paragraph at the i-th (i=1 . . . n) position and the target paragraph at the i-th position, i.e.:

$$s1<\text{->}t1; s2<\text{->}t2, \ldots sn<\text{->}tn$$

Thus, it may be determined that there is a corresponding relationship between the format pattern of the i-th positioned sample paragraph and the i-th positioned target paragraph.

In accordance with an embodiment of the invention, by comparing the relationship between the format pattern of sample paragraphs and the position of target paragraphs, the corresponding relationship of the format pattern of the sample paragraphs with the target paragraphs may be determined.

For example, the number of format patterns of sample paragraphs is equal to the number of sample paragraphs, e.g., the sample paragraphs of a sample object have sequentially n format patterns f1, f2, . . . fn, a target object contains n sequential target paragraphs t1, t2, and . . . tn. Through analysis and comparison, it may be determined that there is corresponding relationship between the i-th format pattern of the sample paragraphs of the sample object and the i-th positioned target paragraphs, namely:

$$f1<\text{->}t1; f2<\text{->}t2, \ldots fn<\text{->}tn$$

Below, in conjunction with the accompanying FIGS. 5A-5D, embodiments of determining the corresponding relationship of the format pattern of the sample paragraphs with the target paragraphs by comparing the positional relationship between the sample paragraphs and the target paragraphs will be described in more detail.

In accordance with an embodiment of the invention, the corresponding relationship of the format pattern of the sample paragraphs with the target paragraphs may be determined by analyzing the format pattern of sample paragraphs and the format pattern of target paragraphs.

The sample object 210 of FIG. 2A and the target object 220 of FIG. 2B may be taken as example in order to understand this embodiment. As shown in FIG. 2A, the format pattern of sample paragraphs 211-216 of the sample object 210 sequentially undergoes four changes:

1. from the format pattern of paragraph 211 to that of paragraph 212;
2. from the format pattern of paragraph 212 to that of paragraph 213;
3. from the format pattern of paragraph 213 to that of paragraphs 214 and 215;
4. from the format of paragraphs 214 and 215 to that of paragraph 216.

As shown in FIG. 2B, the format pattern of sample paragraphs P1-P7 of the sample object 220 sequentially undergoes four changes:

1. from the format pattern of paragraph P1 to that of paragraph P2;
2. from the format pattern of paragraph P2 to that of paragraphs P3;
3. from the format pattern of paragraph P3 to that of paragraphs P4, P5 and P6;
4. from the format pattern of paragraphs P4, P5 and P6 to that of paragraphs P7.

By comparing format pattern changes in the sample paragraphs and the target paragraphs, it may be determined that the sample paragraphs and the target paragraphs have the following corresponding relationship:

$$(211)<\text{->}(P1);(212)<\text{->}(P2);(213)<\text{->}(P3);$$

$$(214,215)<\text{->}(P4,P5,P6);(216)<\text{->}(P7)$$

Thereby, the corresponding relationship of the format pattern of the sample paragraphs with the target paragraphs may be determined. For example, there is a corresponding relationship between the format pattern of sample paragraph 211 and target paragraph P1. In addition, there is a corresponding relationship between the format pattern of sample paragraphs 214 and 215 and target paragraphs P4, P5 and P6.

According to an embodiment of the invention, the corresponding relationship of the format pattern of the sample paragraphs with the target paragraphs may be determined according to the relationship between the content of the sample paragraphs and the content of the target paragraphs.

By conducting semantic analysis on the content of sample paragraphs and the content of target paragraphs and making a comparison of the content of the sample paragraphs with the content of the target paragraphs, the corresponding relationship of the format pattern of the sample paragraphs with the target paragraphs may be determined based on the result of the comparison.

For example, the content of the sample of paragraph 211 is "Active Event", and the content of target paragraph P1 is "Active Event". They are the same. Thus, the corresponding relationship of the format pattern of the sample paragraph 211 with the target paragraph P1 may be determined. Similarly, since the sample paragraph 216 and the target paragraph P7 are both of the content "Listen to the audio webcast", the corresponding relationship of the format pattern of the sample paragraph 216 with the target paragraph P7 may be determined. In some cases, although the content of a sample paragraph and the content of a target paragraph are not identical, they are similar. Based on that, the corresponding relationship of the format pattern of the sample paragraph with the target paragraph may also be determined accordingly. For example, suppose the content of the sample paragraph 212 is "Topic: Morgan Stanley Cloud Computing Symposium" instead of "Morgan Stanley Cloud Computing Symposium" and the content of the target paragraph P2 is "Topic: Kaufman Brothers Cloud Computing Conference" instead of "Kaufman Brothers Cloud Computing Conference". Through analysis and comparison of the content of the sample paragraph 212 and the content of the target paragraph P2, it is possible to determine the corresponding relationship of the format pattern of the sample paragraph 212 with the target paragraph P2 according to the keyword "Topic".

After Step 330, Step 340 is performed, in which the format pattern of the sample paragraph is applied (or copied) to the corresponding target paragraph.

After determining the corresponding relationship of sample paragraph format patterns with target paragraph, the format pattern of a sample paragraph may be applied to the corresponding target paragraph.

For example, the format pattern of the sample paragraph 211 is <font: Times, font style: plain, color: green>, which is denoted as F211. Such formatting parameters may be extracted from the sample paragraph 211 after it is determined in Step 320 that the user wants to make format pattern replication.

If it is determined that there is corresponding relationship between the format pattern of the sample paragraph 211 and the target paragraph P1, then the format pattern F211 of the sample paragraph 211 is applied to the target paragraph P1. In other words, the target paragraph P1 is made to have the format pattern of <font: Times, font style: plain, color: green> and become the expected paragraph 231 as shown in FIG. 2C.

Those skill in the art shall appreciate that known techniques in the prior art may be employed for extracting formatting parameters of a sample paragraph as well as applying the format pattern of the sample paragraph to a target paragraph. Further explanation in details is not needed here.

In the above description regarding Step 330 it is indicated that the corresponding relationship of the format pattern of the sample paragraphs with the target paragraphs may be determined by comparing the format pattern of the sample paragraphs and the position of target paragraphs. Also, the corresponding relationship of the format pattern of the sample paragraphs with the target paragraphs may be determined by analyzing the format pattern of sample paragraphs and the format pattern of target paragraphs. In practical applications, the two ways may be combined. Below, with reference to the accompanying FIGS. 4 and 5A-5D, two exemplary algorithms that implement Step 330 will be further illustrated. To facilitate understanding, in the description of the algorithms the content as shown in FIGS. 2A-2C will be taken as the example of sample object, target object and expected object.

Figure 4:
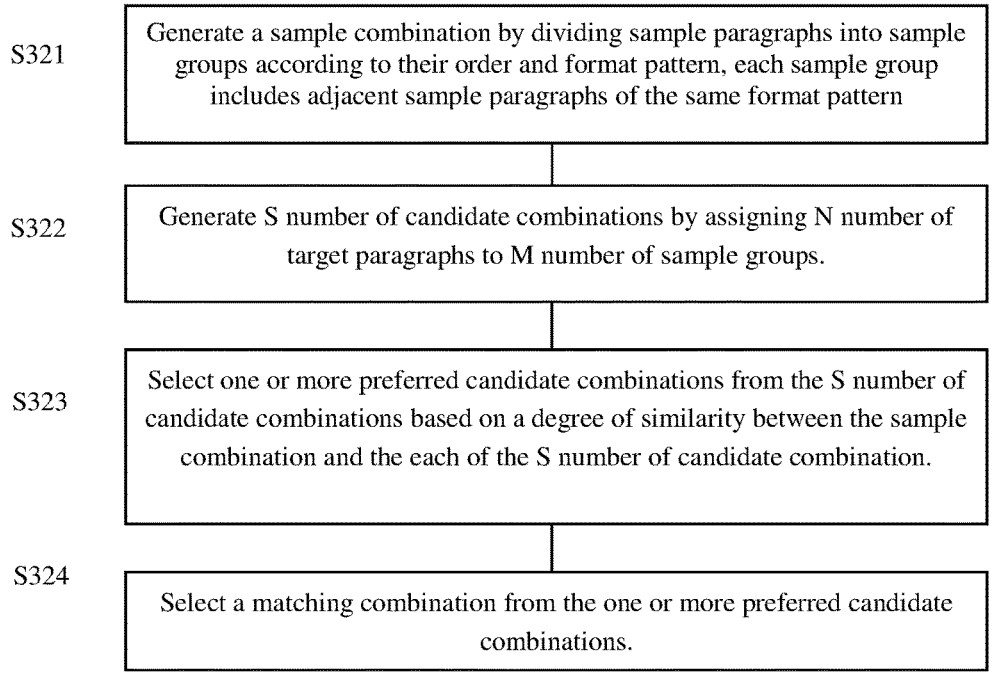
FIG. 4 illustrates a flowchart of a first method of determining a corresponding relationship between sample paragraphs and target paragraphs.

The first algorithm, depicted in FIG. 4, includes Steps S321, S322, S323 and S324.

In Step S321, N sample paragraphs are divided into M (M>1) sample groups, F1-FM, according to their order and format pattern, so that each sample group will include adjacent sample paragraphs of same format pattern.

For example, the sample paragraphs 211-216 shown in FIG. 2A may be divided into five sample groups, as shown in Table 1.

TABLE 1

| Group of Sample Paragraph | | | | | |
|---|---|---|---|---|---|
| Sample Group | $F_1$ | $F_2$ | $F_3$ | $F_4$ | $F_5$ |
| Sample Paragraphs | 211 | 212 | 213 | 214, 215 | 216 |

For example, the sample paragraph 211 belongs to sample group F1, the adjacent sample paragraphs 214 and 215 with same format pattern belong to sample group F4. The mapping relationship of the paragraphs and the sample groups shown in Table 1 may be represented by an equivalent tree structure.

Figure 5A:
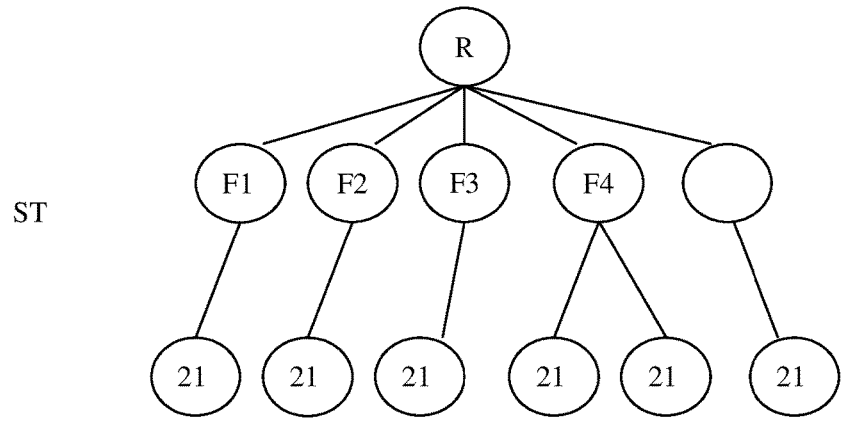
FIG. 5A shows a sample tree representing a sample object according to an embodiment of the invention.

FIG. 5A shows a sample tree ST (i.e. sample combination) representing the mapping relationship of the sample paragraphs and the sample groups shown in Table 1. The sample tree ST includes three layers of nodes. The root node R is a virtual node, the five intermediate nodes F1-F5 represent the five sample groups and the six leaf nodes respectively correspond to the sample paragraphs 211-216. The parent-child relationship between an intermediate node and a leaf node denotes that the corresponding sample group includes the corresponding sample paragraph, and the sample groups $F_1$-$F_5$ represents the format pattern of the sample paragraphs included. Therefore, in the specification, such an intermediate node is also referred to as "format node".

In Step S322, different combinations, or "candidate combinations", are generated such that, for each combination, N target paragraphs are assigned to M sample groups.

Below in Table 2, it is shown various combinations of assigning the seven target paragraphs P1-P7 in FIG. 2B to the five sample groups $F_1$-$F_5$.

TABLE 2

| Combinations of assigning target paragraphs to sample groups | | | | | | |
|---|---|---|---|---|---|---|
| | $F_1$ | $F_2$ | $F_3$ | $F_4$ | $F_5$ | TED |
| 1 | P1 | P2 | P3 | P4 | P5,P6,P7 | 3 |
| 2 | P1 | P2 | P3 | P4,P5 | P6,P7 | 1 |
| 3 | P1 | P2 | P3 | P4,P5,P6 | P7 | 1 |
| 4 | P1 | P2 | P3,P4 | P5 | P6,P7 | 3 |

TABLE 2-continued

Combinations of assigning target paragraphs to sample groups

|    | $F_1$    | $F_2$    | $F_3$ | $F_4$ | $F_5$ | TED |
|----|----------|----------|-------|-------|-------|-----|
| 5  | P1       | P2       | P3,P4 | P5,P6 | P7    | 1   |
| 6  | P1       | P2       | P3    | P4,P5 | P6,P7 | 3   |
| 7  | P1       | P2,P3    | P4    | P5    | P6,P7 | 3   |
| 8  | P1       | P2,P3    | P4    | P5,P6 | P7    | 1   |
| 9  | P1       | P2,P3    | P4,P5 | P6    | P7    | 3   |
| 10 | P1       | P2,P3,P4 | P5    | P6    | P7    | 3   |
| 11 | P1,P2    | P3       | P4    | P5    | P6,P7 | 3   |
| 12 | P1,P2    | P3       | P4    | P5,P6 | P7    | 1   |
| 13 | P1,P2    | P3       | P4,P5 | P6    | P7    | 3   |
| 14 | P1,P2    | P3,P4    | P5    | P6    | P7    | 3   |
| 15 | P1,P1,P3 | P4       | P5    | P6    | P7    | 3   |

In Table 2, columns 2-6 in the first row represent sample groups $F_1$-$F_5$, rows 2-16 represent all candidate combinations. For example, the second row represents that, according to the candidate combination 1, P1, P2, P3, P4, and {P5, P6, and P7} are respectively assigned to sample groups $F_1$-$F_5$.

Generally, the number of candidate combinations for assigning N target paragraphs to M sample groups is n=(N−1)!/[(M−1)!(NM)!]. In this example, M=5, N=7. Therefore, there are (7−1)!/[(5−1)!(7−5)!]=15 kinds of candidate combinations in Table 2.

A candidate combination may also be represented with an equivalent tree structure.

Figure 5B:
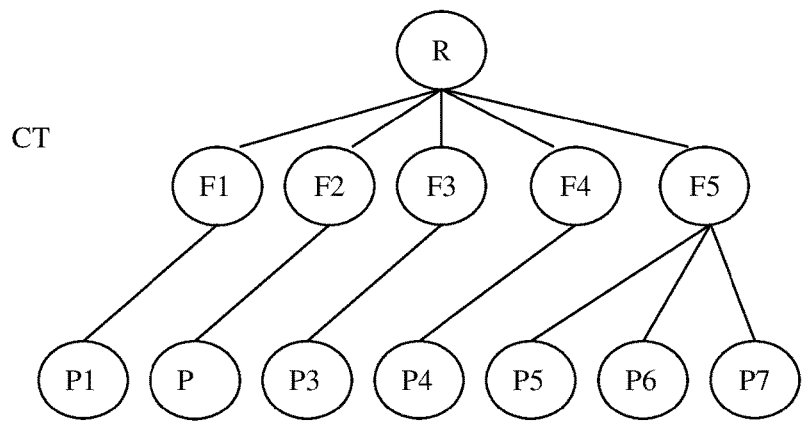
FIG. 5B shows a candidate tree representing a target object according to an embodiment of the invention.
Figure 5C:
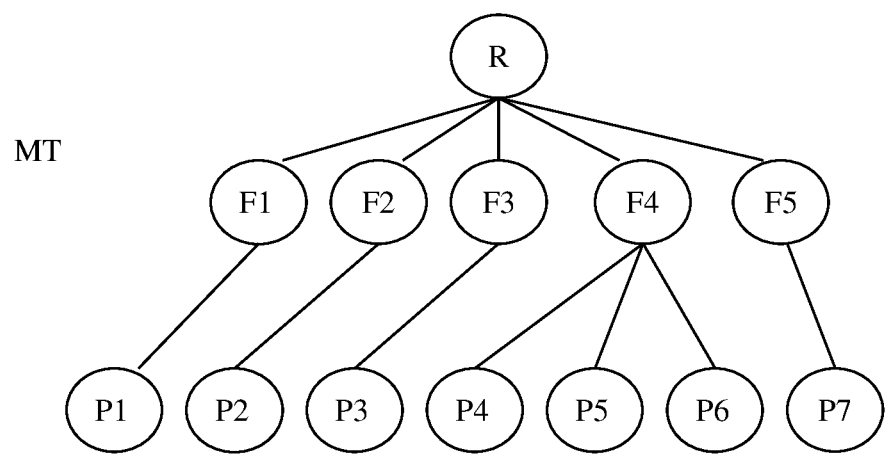
FIG. 5C shows a matching tree according to an embodiment of the invention.

FIG. 5B shows an equivalent candidate tree CT1 that represents the candidate combination 1 shown in Table 2. The candidate tree CT1 contains three layers of nodes. The root node R and the intermediate nodes F1-F5 of are the same as the sample tree ST as shown in FIG. 5A, the seven leaf nodes respectively correspond to the target paragraphs P1-P7. The parent-child relationship between an intermediate node and a leaf node represent the corresponding relationship between a sample group and a target paragraph, i.e. the corresponding relationship between the format pattern of the sample paragraph and the target paragraph.

All of the candidate combinations 1-15 shown in Table 2 may be represented as such a candidate tree.

FIG. 5D is a concise representation of equivalent candidates for the 15 candidate combinations 1-15 as shown in Table 2. In FIG. 5D, the vertical line "|" is used as a separator that divides the nodes P1-P7 into child nodes of the intermediate nodes $F_1$-$F_5$. For example, the nodes P1-P7 shown in the second row are separated into 5 groups by the vertical line "|". The nodes of the five groups are respectively child nodes of the format nodes F1, F2, F3, F4 and F5. Therefore, the second row is a concise representation of the candidate tree $CT_1$ shown in FIG. 5B. Similarly, rows 3 to 16 respectively represent candidate trees corresponding to candidate combinations 2-15, denoted as $CT_2$, $CT_3$, ..., $CT_{15}$.

Generally speaking, a set of such candidate trees, S, includes n candidate trees, denoted as S={CT1, CT2, ..., CTn}, wherein a candidate tree CT contains a root node, M intermediate nodes and N leaf nodes, and each of the leaf nodes represents a target paragraph, n=(N−1)!/[(M−1)!(N−M)!].

In Step S323, preferred tree(s) is selected from the set of candidate trees S, wherein a preferred tree is a candidate tree from the set of candidate trees S that has the smallest tree edit distance (TED) with the sample tree ST.

The tree edit distance (TED) between a candidate tree CT and the sample tree ST is calculated by the following formula:

$$\text{TED} = \sum_{i=1}^{M} |N_i(s) - N_i(t)| \quad \text{Formula (1)}$$

wherein $N_i(s)$ is the number of child nodes of the i-th intermediate node $F_i$ of the sample tree ST, and $N_i(t)$ is the number of child nodes of the i-th intermediate node $F_i$ of the candidate tree CT.

In fact, the tree edit distance (TED) between a candidate tree CT and the sample tree ST (simply referred to as "TED for the candidate tree") is defined to be the sum of the number of operations of deleting a leaf node from the candidate tree and the number of operations of adding a leaf node into the candidate tree as required in order for the candidate tree CT to be converted to the sample tree ST. The TED characterizes the degree of similarity between the candidate tree CT and the sample tree ST. The smaller the TED is, the higher the degree of similarity between the candidate tree CT and the sample tree ST is.

According to Formula (1), the tree edit distance TED between each of the candidate trees in FIG. 4D and the sample tree ST shown in FIG. 5A may be calculated, as shown in the column 7 of Table 2.

The column 7 of Table 2 shows the TED of each of the candidate trees $CT_1$-$CT_{15}$ corresponding to fifteen candidate combinations 1-15. For example, the TED for the candidate tree $CT_1$ is 3, denoted as TED($CT_1$)=3.

From Table 2 it can be seen that

TED($CT_2$)=TED($CT_3$)=TED($CT_5$)=TED($CT_8$)=TED($CT_{12}$)=1 i.e., the TED of candidate trees $CT_2$, $CT_3$, $CT_5$, $CT_8$ and $CT_{12}$ is the smallest. Therefore, they are selected to be preferred trees.

Hereinafter, a set of candidate trees is denoted by S'.

In Step S324, a matching tree MT is selected from the preferred tree(s).

If there is only one preferred tree in the set S', this preferred tree will be taken as the matching tree MT. The corresponding relationship of sample paragraph format patterns with target paragraphs may be determined from the relationship among the leaf nodes P1-P7 and the format nodes F1-F5 of the matching tree MT.

By Steps S321-S324, the relationship among sample paragraph format patterns and target paragraph positions may be compared and the corresponding relationship among sample paragraph format patterns and target paragraphs may be determined.

If there are multiple preferred trees in the set S', then a matching tree may be determined from the multiple preferred trees by means of analyzing sample paragraph format patterns and target paragraph format patterns, thereby determining the corresponding relationship of sample paragraph format patterns with target paragraphs. This may be realized by a second algorithm.

Generally speaking, for two or more adjacent target paragraphs that will have the same format pattern after the format-copying process, their format patterns are relatively similar prior to the format-copying process. For example, the degree of similarity among format patterns of the target paragraphs P4, P5 and P6 is greater than the degree of similarity between format patterns of the target paragraphs P3 and P4. Based on the above observation, the second algorithm determines which target paragraphs will most likely have the same format pattern after format-copying based on the original formatting information of the target paragraphs, thereby selecting the matching tree.

The second algorithm includes Steps S341-S343.

In Step S341, format patterns of target paragraphs are ascertained.

A format vector V=(X1, X2, ... Xk) may be used to represent the format pattern of a target paragraph, wherein each component of the format vector represents a format attribute.

For example, a format vector v=(x1, x2, ... x4) may be pre-defined, in which the component x1 represents format attribute "plain", x2 represents attribute "italic", x3 represents the attribute "bold" and x4 represents attribute "underlined". Then the formatting information of the target paragraphs P1-P7 in FIG. 2B is shown Table 3.

TABLE 3

| | Format Vector of Object Paragraph | | | | | | |
|---|---|---|---|---|---|---|---|
| | Object Paragraph | | | | | | |
| | P1 | P2 | P3 | P4 | P5 | P6 | P7 |
| v | (1, 0, 0, 0) | (0, 0, 1, 0) | (1, 0, 0, 0) | (0, 1, 0, 0) | (0, 1, 0, 0) | (0, 1, 0, 0) | (1, 0, 0, 0) |

In Table 3, the first row represents seven paragraphs P1-P7, and each column on the second row represents the value (x1, x2, x3, x4) of the format vector of a corresponding target paragraph, wherein component xi has one-to-one correspondence with attribute Xi of the format vector V=(X1, X2, ... X4). If the value of a component xi is "1", it means the corresponding attribute Xi is included in the format pattern. If the value of a component xi is "0", it means the corresponding attribute Xi is not included in the format pattern. For example, in Table 3, the cell at row 2 and column 2 represents the format attribute value of the paragraph P1, denoted as v(P1)=(1,0,0,0), which means that the text format of the paragraph P1 includes "plain", but does not include "italic", does not include "bold", and does not include "underlined".

In Step S342, for each of preferred trees in the set S', a corresponding sum of square error (SSE) is calculated according to the following Formula (2):

$$SSE = \sum_{i=1}^{M} \sum_{x \in G_i} D(c_i, x)$$

Formula(2)

The meaning of parameters in Formula (2) is illustrated below by way of example.

M is the number of intermediate nodes of a preferred tree PT. In the present example, M=7.

$G_i$ represents a cluster of format vectors of sample paragraphs. For an intermediate node $F_i$ (i=1 ... M) of any preferred tree PT, the corresponded cluster $G_i$ includes format vectors of sample paragraphs represented by all child nodes of the intermediate node $F_i$. For example, in the present example, $CT_2$ is one preferred tree from the preferred tree set S'={$CT_2$, $CT_3$, $CT_5$, $CT_8$, $CT_{12}$}. Five clusters that respectively correspond to the intermediate node $F_1$-$F_5$ of the preferred tree are:

$G_1$={(1,0,0,0)}; $G_2$={(0,0,1,0)}; $G_3$={(1,0,0,0)}; $G_4$={(0,1,0,0), (0,1,0,0)}; $G_5$={(0,1,0,0), (1,0,0,0)}.

$c_i$ is the center vector of cluster $G_i$, which is the vector obtained by calculating the average of all vectors in the cluster $G_i$. For example, for $G_5$={(0,1,0,0) (1,0,0,0)}, the center vector $c_i$ is (0.5,0.5,0,0).

Function "D" represents the distance of two vectors. Generally speaking, given two vectors v1=$(x_1, x_2, ... x_k)$ and v2=$(y_1, y_2, ... y_k)$, the distance D(v1, v2) between the vectors v1 and v2 is:

$$D(v1,v2) = \|(x_1, ..., x_k) - (y_1, ..., y_k)\| = ((x_1-y_1)^2 + ... + (x_k-y_k)^2)^{1/2}$$

Formula (3)

From FIG. 5D and Table 3, a Table 4 may be derived as below.

TABLE 4

| Intermediate Node | Target Paragraph | Cluster | Vector Space G | Center Vector $c_i$ | $D(c_i, x)$ | $\Sigma D(c_i, x)^2$ |
|---|---|---|---|---|---|---|
| $CT_1$ $F_1$ | P1 | $G_1$ | (1, 0, 0, 0) | (1, 0, 0, 0) | 0 | 0 |
| $F_2$ | P2 | $G_2$ | (0, 0, 1, 0) | (0, 0, 1, 0) | 0 | 0 |
| $F_3$ | P3 | $G_3$ | (1, 0, 0, 0) | (1, 0, 0, 0) | 0 | 0 |
| $F_4$ | P4 | $G_4$ | (0, 1, 0, 0) | (0, 1, 0, 0) | 0 | 0 |
| | P5 | | (0, 1, 0, 0) | | 0 | |
| $F_5$ | P6 | $G_5$ | (0, 1, 0, 0) | (0.5, 0.5, 0, 0) | $0.5^{1/2}$ | 1 |
| | P7 | | (1, 0, 0, 0) | | $0.5^{1/2}$ | |

For example, as shown in the second row of Table 4, the intermediate node $F_1$ has only one child node P1. Accordingly, the cluster $G_1$ includes only one vector (1,0,0,0) and its center vector $c_1$ is (1,0,0,0). The distance D(c1,x) of the vector (1,0,0,0) with the center vector $c_1$ of the cluster $G_1$ is:

$$D(c_1, x) = D((1,0,0,0),(1,0,0,0)) = 0.$$

As another example, as shown in the fifth row of Table 4, the intermediate node $F_5$ has two child nodes P6 and P7. Accordingly, the cluster $G_5$ includes two vectors (0,1,0,0) and (1,0,0,0), and its center vector $c_5$ is (0.5,0.5,0,0). The distance of the first vector (0,1,0,0) with the center vector $c_5$ of the cluster $G_5$ is $D((0.5,0.5,0,0),(0,1,0,0))=0.5^{1/2}$, and The distance of the second vector (1,0,0,0) with the center vector $c_5$ is $D((0.5,0.5,0,0)(1,0,0,0))=0.5^{1/2}$.

$$SSE(CT_1) = \sum_{x \in G_1} D(c_1,x)^2 + \sum_{x \in G_2} D(c_2,x)^2 + \sum_{x \in G_3} D(c_3,x)^2 + \sum_{x \in G_4} D(c_4,x)^2 + \sum_{x \in G_5} D(c_5,x)^2 = \|(1,0,0,0)-(1,0,0,0)\|^2 + \|(0,0,1,0)-(0,0,1,0)\|^2 + \|(1,0,0,0)-(1,0,0,0)\|_2 + \|(0,1,0,0)-(0,1,0,0)\|^2 + \|(0,1,0,0)-(0,1,0,0)\|^2 + (\|(0.5,0.5,0,0)-(0,1,0,0)\|^2 + \|(0.5,5,0,0)-(1,0,0,0)\|^2) = 0+0+0+0+1=1$$

$$SSE(CT_1) = \sum_{x \in G_1} D(c_1,X)^2 + \sum_{x \in G_2} D(c_2,x)^2 + \sum_{x \in G_3} D(c_3,x)^2 + \sum_{x \in G_4} D(c_4,X)^2 + \sum_{x \in G_5} D(c_5,x)^2 = \|(1,0,0,0)-(1,0,0,0)\|^2 + \|(0,0,1,0)-(0,0,1,0)\|^2 + \|(1,0,0,0)-$$

$(1,0,0,0)\|_2 + \|(0,1,0,0)-(0,1,0,0)\|^2 + \|(0,1,0,0)-(0,1,0,0)\|^2 + (\|(0.5,0.5,0,0)-(0,1,0,0)\|^2 + \|(0.5,0.5,0,0)-(1,0,0,0)\|^2) = 0+0+0+1=1$.

As for the CT3, G1={(1,0,0,0)}, G2={(0,0,1,0)}, G3={(1,0,0,0)}, G4={(0,1,0,0), (0,1,0,0), 0,1,0,0)} and G5={(1, 0,0,0)}. Similarly, it can be calculated that $SSE(CT3) = \Sigma_{x \in G1} D(c_1,x)^2 + \Sigma_{x \in G2} D(c_2,x)^2 + \Sigma_{x \in G3} D(c_3,x)^2 + \Sigma_{x \in G4} D(c_4,x)^2 + \Sigma_{x \in G5} D(c_5,x)^2 = 0$, as shown in the following Table 5.

TABLE 5

|  | Intermediate Node | Target Paragraph | Cluster | Vector Space G | Center Vector $c_i$ | $D(c_i, x)$ | $\Sigma D(c_i, x)^2$ |
|---|---|---|---|---|---|---|---|
| $CT_3$ | $F_1$ | P1 | $G_1$ | (1, 0, 0, 0) | (1, 0, 0, 0) | 0 | 0 |
|  | $F_2$ | P2 | $G_2$ | (0, 0, 1, 0) | (0, 0, 1, 0) | 0 | 0 |
|  | $F_3$ | P3 | $G_3$ | (1, 0, 0, 0) | (1, 0, 0, 0) | 0 | 0 |
|  | $F_4$ | P4 | $G_4$ | (0, 1, 0, 0) | (0, 1, 0, 0) | 0 | 0 |
|  |  | P5 |  | (0, 1, 0, 0) |  | 0 |  |
|  |  | P6 |  | (0, 1, 0, 0) |  | 0 |  |
|  | $F_5$ | P7 | $G_5$ | (1, 0, 0, 0) | (1, 0, 0, 0) | 0 | 0 |

Similarly, it may be calculated that $SSE(CT_5) = 0+0+1+0+0 = 1$, as shown in the following Table 6.

TABLE 6

|  | Intermediate Node | Target Paragraph | Cluster | Vector Space G | Center Vector $c_i$ | $D(c_i, x)$ | $\Sigma D(c_i, x)^2$ |
|---|---|---|---|---|---|---|---|
| $CT_5$ | $F_1$ | P1 | $G_1$ | (1, 0, 0, 0) | (1, 0, 0, 0) | 0 | 0 |
|  | $F_2$ | P2 | $G_2$ | (0, 0, 1, 0) | (0, 0, 1, 0) | 0 | 0 |
|  | $F_3$ | P3 | $G_3$ | (1, 0, 0, 0) | (0.5, 0.5, 0, 0) | $0.5^{1/2}$ | 1 |
|  |  | P4 |  | (0, 1, 0, 0) |  | $0.5^{1/2}$ |  |
|  | $F_4$ | P5 | $G_4$ | (0, 1, 0, 0) | (0, 1, 0, 0) | 0 | 0 |
|  |  | P6 |  | (0, 1, 0, 0) |  | 0 |  |
|  | $F_5$ | P7 | $G_5$ | (1, 0, 0, 0) | (1, 0, 0, 0) | 0 | 0 |

Similarly, it may be calculated that $SSE(CT8) = 0+1+0+0+0 = 1$, as shown in the following Table 7.

TABLE 7

|  | Intermediate Node | Target Paragraph | Cluster | Vector Space G | Center Vector $c_i$ | $D(c_i, x)$ | $\Sigma D(c_i, x)^2$ |
|---|---|---|---|---|---|---|---|
| $CT_8$ | $F_1$ | P1 | $G_1$ | (1, 0, 0, 0) | (1, 0, 0, 0) | 0 | 0 |
|  | $F_2$ | P2 | $G_2$ | (0, 0, 1, 0) | (0.5, 0.5, 0, 0) | $0.5^{1/2}$ | 1 |
|  |  | P3 |  | (1, 0, 0, 0) |  | $0.5^{1/2}$ |  |
|  | $F_3$ | P4 | $G_3$ | (0, 1, 0, 0) | (0, 1, 0, 0) | 0 | 0 |
|  | $F_4$ | P5 | $G_4$ | (0, 1, 0, 0) | (0, 1, 0, 0) | 0 | 0 |
|  |  | P6 |  | (0, 1, 0, 0) |  | 0 |  |
|  | $F_5$ | P7 | $G_5$ | (1, 0, 0, 0) | (1, 0, 0, 0) | 0 | 0 |

Similarly, it may be calculated that $SSE(CT_{12}) = 0+1+0+0+0 = 1$, as shown in the following Table 8.

TABLE 8

|  | Intermediate Node | Target Paragraph | Cluster | Vector Space G | Center Vector $c_i$ | $D(c_i, x)$ | $\Sigma D(c_i, x)^2$ |
|---|---|---|---|---|---|---|---|
| $CT_{12}$ | $F_1$ | P1 | $G_1$ | (1, 0, 0, 0) | (1, 0, 0, 0) | 0 | 0 |
|  |  | P2 |  | (0, 0, 1, 0) |  |  |  |
|  | $F_2$ | P3 | $G_2$ | (1, 0, 0, 0) | (0.5, 0.5, 0, 0) | $0.5^{1/2}$ | 1 |
|  |  |  |  |  |  | $0.5^{1/2}$ |  |
|  | $F_3$ | P4 | $G_3$ | (0, 1, 0, 0) | (0, 1, 0, 0) | 0 | 0 |
|  | $F_4$ | P5 | $G_4$ | (0, 1, 0, 0) | (0, 1, 0, 0) | 0 | 0 |
|  |  | P6 |  | (0, 1, 0, 0) |  | 0 |  |
|  | $F_5$ | P7 | $G_5$ | (1, 0, 0, 0) | (1, 0, 0, 0) | 0 | 0 |

In Step S343, the preferred tree for which the corresponding SSE is smallest is taken as the matching tree.

In the example described above, $SSE(CT_3) = 0$. Therefore, the preferred tree $CT_3$ is taken as the matching tree. FIG. 4C shows a matching tree MT, which is actually a complete representation of the preferred tree $CT_3$ as shown in FIG. 4D. In the matching tree MT, nodes P1, P2, P3, P7 are child nodes of format nodes $F_1$, $F_2$, $F_3$, and $F_5$ respectively, and nodes P4, P5 and P5 are child nodes of the format node $F_4$.

Thus it can be determined that there is a corresponding relation between the sample paragraph format pattern represented by the format node $F_1$ and the target paragraph represented by the node P1, there is a corresponding relation between the sample paragraph format pattern represented by the format node $F_2$ and the target paragraph represented by the node P2, there is a corresponding relation between the sample paragraph format pattern represented by the format node $F_3$ and the target paragraph represented by the node P3, there is a corresponding relation between the sample paragraph format pattern represented by the format node $F_4$ and the target paragraphs represented by the node P4,P5 and P6, and there is a corresponding relation between the sample paragraph format pattern represented by the format node $F_5$ and the target paragraph represented by the node P7.

After the corresponding relationship between the sample paragraph format patterns and the target paragraphs is determined, Step 340 may be performed in which respective sample paragraph format patterns represented by $F_1$ to $F_5$ are copied to the corresponded target paragraphs according to the determined corresponding relation. For example, for the sample object 210 shown in FIG. 2A and the target object 220 shown in FIG. 2B, the expected object 230 shown in FIG. 2C may be obtained.

Embodiments of the method for copying a text format pattern have been described above. Next, with reference to FIG. 5, embodiments of an apparatus for copying a text format pattern will be described.

Figure 6:
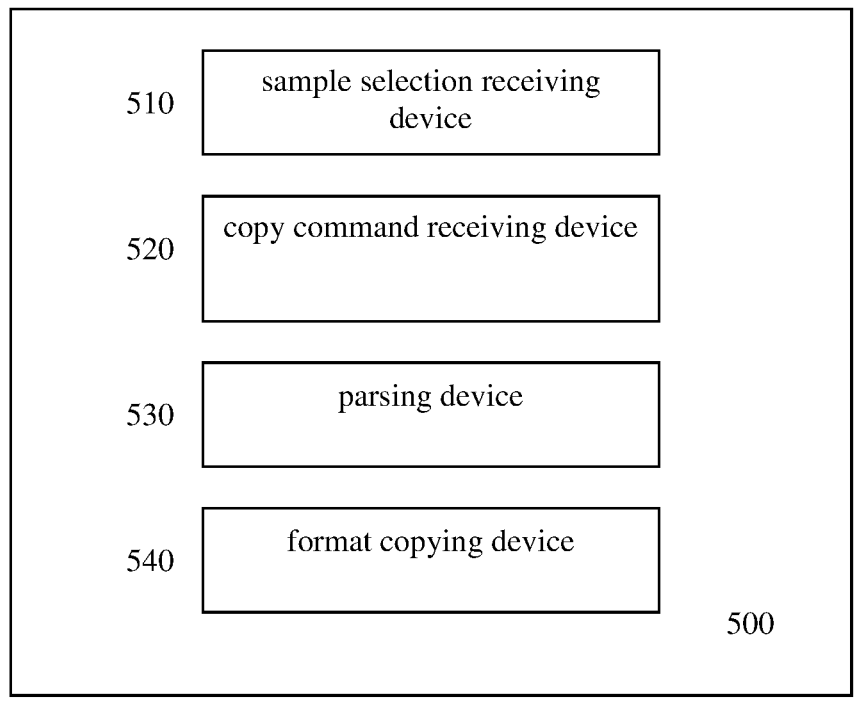
FIG. 6 illustrates a block diagram of the apparatus for copying a text format pattern according to an embodiment of the invention.

As shown in FIG. 6, the apparatus 500 for copying a text format pattern according to an embodiment of the invention includes a sample selection receiving device 510, a copy command receiving device 520, a parsing device 530 and a format copying device 540.

The sample selection receiving device 510 is configured to receive the selection of a sample object from a user, the sample object including multiple sample paragraphs of which at least two sample paragraphs have different format patterns.

The copy command receiving device 520 is configured to receive an instruction of format-copying from the user, the instruction indicating re-formatting a target object with the format pattern of the sample object, wherein the target object contains multiple target paragraphs.

The parsing device 530 is configured to determine the corresponding relationship of the format pattern of the sample paragraphs with the target paragraphs.

The format copying device 540 is configured to apply the format pattern of the sample paragraphs to the target paragraphs based on the corresponding relationship determined by the parsing device 530.

According to an embodiment of the invention, the parsing device 530 is further configured to determine the corresponding relationship of the format pattern of the sample paragraphs with the target paragraphs by comparing the relationship between the format pattern of the sample paragraphs and the position of the target paragraphs.

According to an embodiment of the invention, the parsing device 530 is further configured to determine the corresponding relationship of the format pattern of the sample paragraphs with the target paragraphs by analyzing the format pattern of the sample paragraphs and the format pattern of the target paragraphs.

According to an embodiment of the invention, the parsing device 530 is further configured to determine the corresponding relationship between the format pattern of the sample paragraphs and the target paragraphs by comparing the positional relationship between the sample paragraphs and the target paragraphs.

According to an embodiment of the invention, the parsing device 530 is further configured to determine the corresponding relationship of the format pattern of the sample paragraphs with the target paragraphs according to the relationship between the content of the sample paragraphs and the content of the target paragraphs.

Various embodiments of the apparatus for copying a text format pattern are described above. Since the method for copying a text format pattern has been described in foregoing paragraphs, some of the content that is duplicate with the description of the method is omitted from the description of the apparatus.

Compared with prior art techniques, various embodiments of the invention may be applied in electronic document processing to copy the format pattern of one document fragment comprising multiple paragraphs with different format patterns to another document fragment comprising multiple paragraphs at a time, thus simplifying the operation of the user in editing electronic document. The technical effect is significant.

Embodiments of the invention have been described. The above description is only exemplary, rather than exhaustive or limited to the embodiments disclosed. Those skilled in the art shall appreciate that various modifications and alterations changes thereto may be readily made. The choice of terms herein is intended for best explaining the principle, practical application or improvement to the techniques in the market of the embodiments, or allowing those skilled in the art to understand various embodiments disclosed herein.

The invention claimed is:

1. A computer program product for reformatting a plurality of target paragraphs with a format pattern of a plurality of sample paragraphs, the computer program product comprising one or more computer-readable storage media and program instructions stored on the one or more computer-readable storage media, the program instructions comprising:

program instructions to generate a sample combination by dividing the plurality of sample paragraphs into sample groups according to their order and format pattern, each sample group includes adjacent sample paragraphs of the same format pattern;

program instructions to generate a plurality of different candidate combinations by assigning the plurality of target paragraphs to the sample groups, wherein each of the plurality of candidate combinations comprises a different combination of target paragraphs and sample groups, and each of the plurality of target paragraphs is assigned to only one sample group for each of the plurality of candidate combinations;

program instructions to select two or more preferred candidate combinations from the plurality of candidate combinations based on a degree of similarity between the sample combination and each of the plurality of candidate combinations;

program instructions to select a single matching combination from the two or more preferred candidate combinations; and program instructions to apply the format pattern of the plurality of sample paragraphs to the plurality of target paragraphs in accordance with the single matching combination.

2. The computer program product of claim 1, wherein the plurality of sample paragraphs are arranged in a sequential order and each sample paragraph comprises a position in that sequential order, wherein the plurality of target paragraphs are arranged in a sequential order and each target paragraph comprises a position in that sequential order, further comprising:

program instructions to compare the format pattern of sample paragraphs and target paragraphs with the same position.

3. The computer program product of claim 1, wherein the number of sample groups is less than or equal to the number of sample paragraphs, and the number of sample groups is less than or equal to the number of target paragraphs.

4. The computer program product of claim 1, further comprising:
program instructions to compare a positional relationship between the sample paragraphs to a positional relationship between the target paragraphs.

5. The computer program product of claim 1, further comprising:
program instructions to conduct semantic analysis on the content of the sample paragraphs and the content of the target paragraphs to determine a relationship between the content of the sample paragraphs and the content of the target paragraphs.

6. The computer program product of claim 1, wherein the sample object and the target object are from different electronic documents.

7. The computer program product of claim 1, wherein the possible combinations are determined using the equation: $n=(N-1)/[(M-1)!(NM)!]$, where n is the number of possible combinations.

8. The computer program product of claim 1, the content of the sample paragraph is textual and each of the sample paragraphs is separated by a pre-defined delimiters.

9. A computer program product product for reformatting a set of target paragraphs with a format pattern of a set of sample paragraphs, the computer program product comprising one or more computer-readable storage media and program instructions stored on the one or more computer-readable storage media, the program instructions comprising:
program instructions to generate a sample combination by dividing the set of sample paragraphs into sample groups according to their order and format pattern, each sample group includes adjacent sample paragraphs of the same format pattern;
program instructions to determine a plurality of all possible combinations of the set of target paragraphs and the sample groups, wherein each of the target paragraphs is assigned to only one sample group for each possible combination;
program instructions to calculate a degree of similarity between the sample combination and each of the possible combinations, the degree of similarity is the sum of the number of operations of removing a target paragraph from a sample group for each of the possible combinations and the number of operations of adding a target paragraph to a sample group for each of the possible combinations in order for each of the possible combination to match the sample combination;
program instructions to select two or more preferred combinations from the plurality of possible combinations based on the degree of similarity between the sample combination and each of the possible combinations, wherein the two or more preferred combinations comprises the smallest degree of similarity;
program instructions to select a matching combination from the two or more preferred candidate combinations, the single matching combination having the same combination of target paragraphs and sample groups as the sample combination; and
program instructions to apply the format pattern of the set of sample paragraphs to the set of target paragraphs based on the single matching combination.

10. The computer program product of claim 9, wherein the plurality of sample paragraphs are arranged in a sequential order and each sample paragraph comprises a position in that sequential order, wherein the plurality of target paragraphs are arranged in a sequential order and each target paragraph comprises a position in that sequential order, further comprising:
program instructions to compare the format pattern of sample paragraphs and target paragraphs with the same position.

11. The computer program product of claim 9, wherein the number of sample groups is less than or equal to the number of sample paragraphs, and the number of sample groups is less than or equal to the number of target paragraphs.

12. The computer program product of claim 9, further comprising:
program instructions to compare a positional relationship between the sample paragraphs to a positional relationship between the target paragraphs.

13. The computer program product of claim 9, further comprising:
program instructions to conduct semantic analysis on the content of the sample paragraphs and the content of the target paragraphs to determine a relationship between the content of the sample paragraphs and the content of the target paragraphs.

14. The computer program product of claim 9, wherein the sample object and the target object are from different electronic documents.

15. The computer program product of claim 9, wherein the possible combinations are determined using the equation: $n=(N-1)/[(M-1)!(NM)!]$, where n is the number of possible combinations.

16. The computer program product of claim 9, the content of the sample paragraph is textual and each of the sample paragraphs is separated by a pre-defined delimiters.

* * * * *